United States Patent

Ito

[11] Patent Number: 5,559,636
[45] Date of Patent: Sep. 24, 1996

[54] ZOOM LENS SYSTEM

[75] Inventor: Takayuki Ito, Tokyo, Japan

[73] Assignee: Asahi Kogaku Kogyo Kabushiki Kaisha, Tokyo, Japan

[21] Appl. No.: 339,255

[22] Filed: Nov. 10, 1994

[30] Foreign Application Priority Data

Nov. 12, 1993 [JP] Japan .................................. 5-283619

[51] Int. Cl.⁶ ...................................................... G02B 15/14
[52] U.S. Cl. ............................................................ 359/689
[58] Field of Search ..................................... 359/689, 683, 359/686

[56] References Cited

U.S. PATENT DOCUMENTS

| 4,773,744 | 9/1988 | Yamanashi . |
| 4,812,026 | 3/1989 | Iima . |
| 5,218,476 | 6/1993 | Ito . |

FOREIGN PATENT DOCUMENTS

| 63-153511 | 6/1988 | Japan . |
| 404165319A | 6/1992 | Japan . |
| 405088085A | 4/1993 | Japan . |
| 2259789 | 3/1993 | United Kingdom . |
| 2260423 | 4/1993 | United Kingdom . |
| 22600201 | 4/1993 | United Kingdom . |

Primary Examiner—Georgia Y. Epps
Assistant Examiner—Jacqueline M. Steady
Attorney, Agent, or Firm—Greenblum & Bernstein P.L.C.

[57] ABSTRACT

A zoom lens system includes at least three lens groups including a positive first lens group, a positive second lens group, and a negative third lens group, in this order from an object side. The first, second and third lens groups are all moved toward the object side during zooming from a wide angle extremity to a telephoto extremity so that a distance between the first and second lens groups increases and a distance between the second and third lens groups decreases. The zoom lens system satisfies the formulae:

$$0.7 < f_L/f_1 < 1.4;$$

and $$2.0 < m_{3L} < 2.8,$$

wherein "$f_L$" designates the focal length of a whole lens system at the telephoto extremity, "$f_1$" designates the focal length of the first lens group, and "$m_{3L}$" designates the lateral magnification of the third lens group at the telephoto extremity.

5 Claims, 12 Drawing Sheets

ZOOM LENS SYSTEM

BACKGROUND OF THE INVENTION

1. Field of the Invention

The present invention relates to a zoom lens system for a compact camera in which a back-focal distance is restricted. In particular, the present invention relates to a zoom lens system of a relatively large aperture in which the zooming ratio is approximately 2; the F-number at the wide angle extremity is approximately 2.8; and the F-number at the telephoto extremity is approximately 3.5 to 4.

2. Description of Related Art

In general, a zoom lens for a compact camera whose zooming ratio is approximately 2 usually employs two lens groups. In such a known zoom lens, the F-numbers at the wide angle extremity and the telephoto extremity are around 3.5 to 4 and around 6.7 to 8, respectively. If a mechanical aperture is designed to be large in order to obtain a small F-number at the telephoto extremity in a zoom lens having two lens groups, it results in a zoom lens size which is large and has considerable aberrations which are difficult to correct.

SUMMARY OF THE INVENTION

Accordingly, it is an object of the present invention to provide a small zoom lens for a compact camera with a large aperture in which the F-numbers at the wide angle extremity and the telephoto extremity are approximately 2.8 and approximately 3.5 to 4, respectively.

To achieve the object mentioned above, according to an aspect of the present invention, there is provided a zoom lens system including at least three lens groups. A first lens group has a positive focal length, a second lens group has a positive focal length, and a third lens group has a negative focal length. The lens groups are arranged in this order from an object side, the first, second and third lens groups being moved toward the object side during zooming from the wide angle extremity toward the telephoto extremity, so that the distance between the first and second lens groups is increased and the distance between the second and third lens groups is reduced, to satisfy the following relationships;

(1) $0.7 < f_L/f_1 < 1.4$;

(2) $2.0 < m_{3L} < 2.8$, wherein, "$f_L$" designates a focal length of the whole lens system when at a telephoto extremity; "$f_1$" designates a focal length of the first lens group; and "$m_{3L}$" designates a lateral magnification of the third lens group at the telephoto extremity.

Preferably, a first lens of a positive first lens group adjacent to an object to be photographed is made of a negative lens having a concave surface located on the object side and satisfies the following formula:

(3) $-1.3 < f_s/r_{1-1} < 0$, wherein "$r_{1-1}$" designates a radius of curvature of a first surface (adjacent to the object) of the first lens group; and "$f_s$" designates a focal length of the whole lens system at the wide angle extremity.

Preferably, a second positive lens group comprises a negative subgroup and a positive subgroup, in this order from the object side. The lens surface of the negative subgroup located closest to an object to be photographed is a concave surface, and the positive subgroup includes a cemented lens that satisfies the following formulae:

(4) $-2.0 < f_s/r_{2-1} < -1.0$;

(5) $2.0 < f_s/|r_{2C}| < 3.0$, wherein, "$r_{2-1}$" designates a radius of curvature of the lens surface of the second lens group that is located closest to an object to be photographed; and "$r_{2C}$" designates a radius of curvature of the cemented surface of the cemented lens.

Preferably, a third negative lens includes a first lens, located closest to the object to be photographed, that is a positive lens having a convex surface located on the object image side and which satisfies the following formula:

(6) $-2.0 < f_s/r_{3-2} < -1.0$, wherein, "$r_{3-2}$" designates a radius of curvature of the second lens surface (on the object image side) of the positive lens of the third lens group.

It is preferable that the first and third lens groups satisfy the following formulae:

(7) $0.7 < (X_1/X_3)_L < 1.1$;

and (8) $0.03 < (X_1/X_3)_L - (X_1/X_3)_M < 0.2$, wherein, "$(X_1/X_3)_L$" designates a ratio of the displacements of the first and third lens groups from wide angle extremity to the telephoto extremity; and "$(X_1/X_3)_M$" designates a ratio of displacements of the first and third lens groups from the wide angle extremity to a vicinity of an intermediate focal length $f_M$, where $f_M \approx (f_s \cdot f_L)^{1/2}$.

The present disclosure relates to subject matter contained in Japanese patent application No. 05-283619 (filed on Nov. 12, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

In a zoom lens system having at least three lens groups comprising a first positive lens group, a second positive lens group, and a third negative lens group in this order from an object side, according to the present invention, the first, second and third lens groups being moved toward the object side during the zooming operation, so that the distance between the first and second lens groups is increased and the distance between the second and third lens groups is decreased. Consequently, the diameter of a diaphragm located within the second positive lens group or in the vicinity thereof is smaller than that of a zoom lens having two lens groups to thereby obtain a large aperture ratio. Note that since the range of travel of each lens is reduced in the present invention, in addition to the reduction of the diameter of the diaphragm, the zoom lens system can be miniaturized in comparison with a zoom lens having only two lens groups.

Formula (1) specifies a power of the first lens group. While a large value for the ratio is preferable to miniaturize the zoom lens, if the value of the ratio exceeds the upper limit, the rate of change of spherical aberration and coma caused by a variation of magnification increases. If the value of the ratio is below the lower limit, neither the diaphragm diameter nor the travel range of the lenses can be reduced, making it impossible to achieve both a large aperture ratio and a compact zoom lens.

Formula (2) is related to the third lens group. The magnification of the second lens group is assigned 10 to 20% of the total magnification and the magnification of the third lens group is assigned 90 to 80% of the total magnification. Consequently, in comparison with a conventional zoom lens having two lens groups, the magnification of the third lens group can be reduced by 10 to 20%, so that the travel range of the third lens group and the aberration variation can be reduced in the present invention.

Formula (2) specifies a lateral magnification of the third lens group at the telephoto extremity. To obtain a zoom lens having a large aperture ratio, the lateral magnification of the third lens group must be smaller than the upper limit defined in formula (2), in view of the correction of aberrations. If the lateral magnification exceeds the upper limit, the aberration variation increases due to the range of travel of the third lens group. If the value of the lateral magnification is smaller than the lower limit, either it is difficult to obtain the zooming ratio of approximately 2 for the whole lens system or the range of travel is increased contrary to the compactness of the zoom lens.

Formula (3) is related to the first lens of the first lens group. If the first lens is made of a negative lens whose concave surface is located on the object side, the astigmatism and an curvature of a field can be effectively corrected and the thickness of the first lens group can be reduced.

The second lens group is in the form of a retrofocus type lens group including a negative subgroup and a positive subgroup. Hence, the back focal distance on the short focal length side is prevented from being too small.

Formula (4) relates to a surface of the negative subgroup of the second lens group that is located closest to an object to be photographed. The lens surface is preferably a concave surface of a large radius of curvature. The concave surface is preferably located closest to the first lens group (closest to the object to be photographed) to prevent the back focal distance from being too small and to correct the astigmatism and curvature of the field caused by the first lens group. If the ratio defined in formula (4) exceeds the upper limit, no aberration correction can be effectively carried out. Conversely, if the ratio is smaller than the lower limit, a high-order astigmatism occurs.

Formula (5) relates to the positive subgroup of the second lens group of a large positive power, located on the object image side. Since the second lens group is comprised of a negative subgroup and a positive subgroup in this order from the object side, the positive subgroup adjacent to the object image has a stronger positive power than that of the whole second lens group. Consequently, it is necessary to provide diverging surfaces having a large negative power to correct the aberrations within the second lens group. Taking into account a possible manufacturing error leading to a deterioration of the optical performance, the negative divergent surfaces are preferably cemented. If the ratio defined in formula (5) exceeds the upper limit, the radius of curvature of the cemented surface (mating surface) is reduced. Consequently, the negative surface power is so large that a high-order spherical aberration occurs. Hence, no zoom lens having a large aperture can be obtained. If the ratio defined in formula (5) is smaller than the lower limit, then the aberration cannot be sufficiently corrected within the second lens group, and the aberration varies considerably with the change in zoom magnification.

Formula (6) is related to the negative third lens group, and particularly a lens surface thereof having a strong positive surface power. If the ratio defined in formula (6) exceeds the upper limit, the positive power is so small that the spherical aberration within the third lens group increases too much, resulting in a large aberration variation with a change in the zoom magnification. If the ratio specified in formula (6) is smaller than the lower limit, the positive power is so strong that a high-order spherical aberration occurs particularly at the long focal length.

Formulae (7) and (8) relate to the movement of the first and third lens groups. If the ratio defined in formula (7) is larger than the upper limit, the displacement of the first lens group is too large to correct the spherical aberration from the wide angle extremity to the telephoto extremity. If the ratio is smaller than the lower limit, the displacement of the first lens group is so small that there is only a small change in the distance between the first and second lens groups, and hence, the diameter of the diaphragm cannot be reduced. More preferably, there is a relationship defined by $0.7 < (X_1/X_3)_L < 1.0$ between the displacement of the first and third lens groups. Namely, the displacement of the first lens group is smaller than the displacement of the third lens group so as to easily correct the spherical aberration.

Formula (8) specifies the displacement of the lens groups from the wide angle extremity to an intermediate focal length. The ratio of the displacement between the first and third lens groups from the wide angle extremity to an intermediate focal length is smaller than the ratio of the displacement between the first and third lens groups from the wide angle extremity to the telephoto extremity and effectively corrects the astigmatism from the wide angle extremity to the intermediate focal length. If the value defined in formula (8) exceeds the upper limit, the astigmatism of the meridional rays, particularly from the wide angle extremity to the intermediate focal length, exhibits a large negative value. Conversely, if the value defined in formula (8) is smaller than the lower limit, an over correction of the astigmatism from the wide angle extremity to the intermediate focal length takes place. Note that if there is an aspherical surface within the second lens group in the vicinity of the diaphragm, not only can the spherical aberration and the coma be easily corrected, but also the number of the lenses can be reduced.

Figure 1:
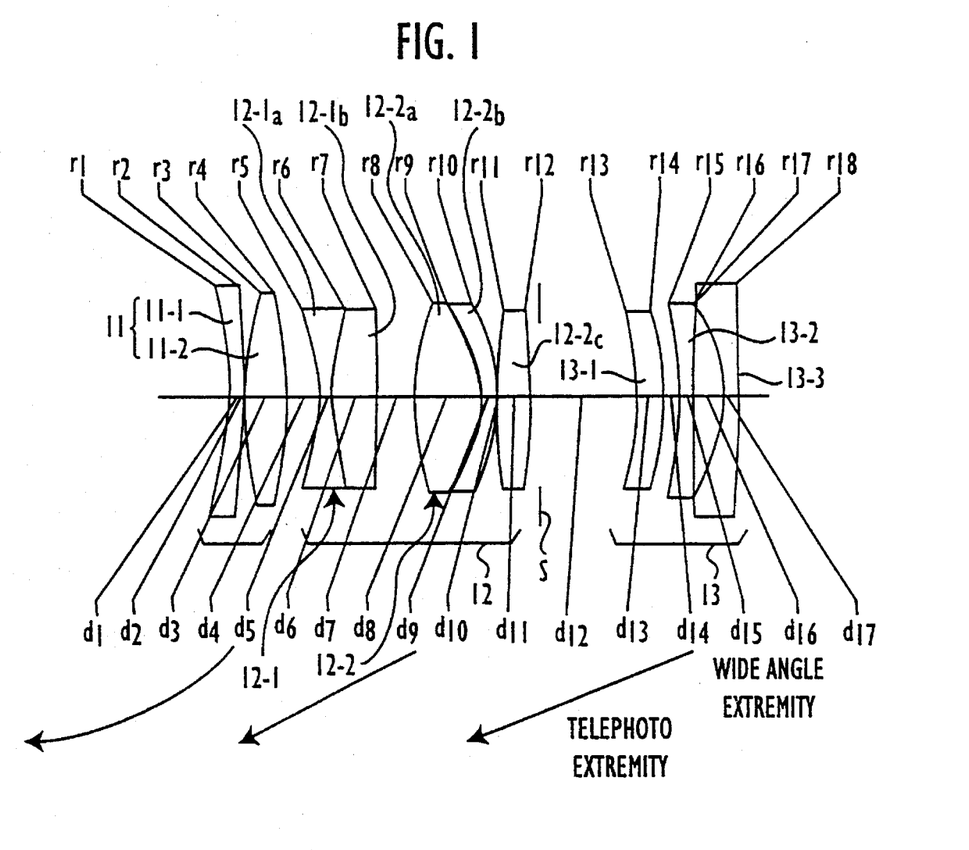
FIG. 1 is a schematic view of a lens arrangement of a zoom lens system, according to a first embodiment of the present invention.

FIG. 1 shows a lens arrangement of a zoom lens system according to a first embodiment in which the positive first lens group 11 comprises of a negative lens 11-1 having a concave surface located on the object side and a positive lens 11-2, arranged in this order from an object side. The second lens group 12 comprises a negative lens group 12-1 and a positive lens group 12-2. The negative lens group 12-1 is comprises a cemented lens consisting of a negative lens 12-1a having a concave surface facing the object side and a positive lens 12-1b. The positive lens group 12-2 comprises a cemented lens 12-2 consisting of a cemented positive lens 12-2a and a negative lens 12-2b, and a positive lens 12-2c. The third lens group 13 comprises a positive lens 13-1 having a convex surface adjacent to the object image side, and negative lenses 13-2 and 13-3. Diaphragm S is provided between the second lens group 12 and the third lens group 13. The lens surface of the second lens group 12 that is closest to the diaphragm S has an aspherical surface. A loci of the movements of the first, second and third lens groups during the zooming operation are indicated in the lower portion of the lens arrangement shown in FIG. 1. The focusing is carried out by the movement of the second lens group 12 having a large positive power.

Numerical data of the zoom lens system shown in FIG. 1 is shown in Table 1 below. Diagrams of various aberrations thereof at a wide-angle extremity, an intermediate focal length and a telephoto extremity are shown in FIGS. 2, 3 and 4, respectively.

Figure 2:
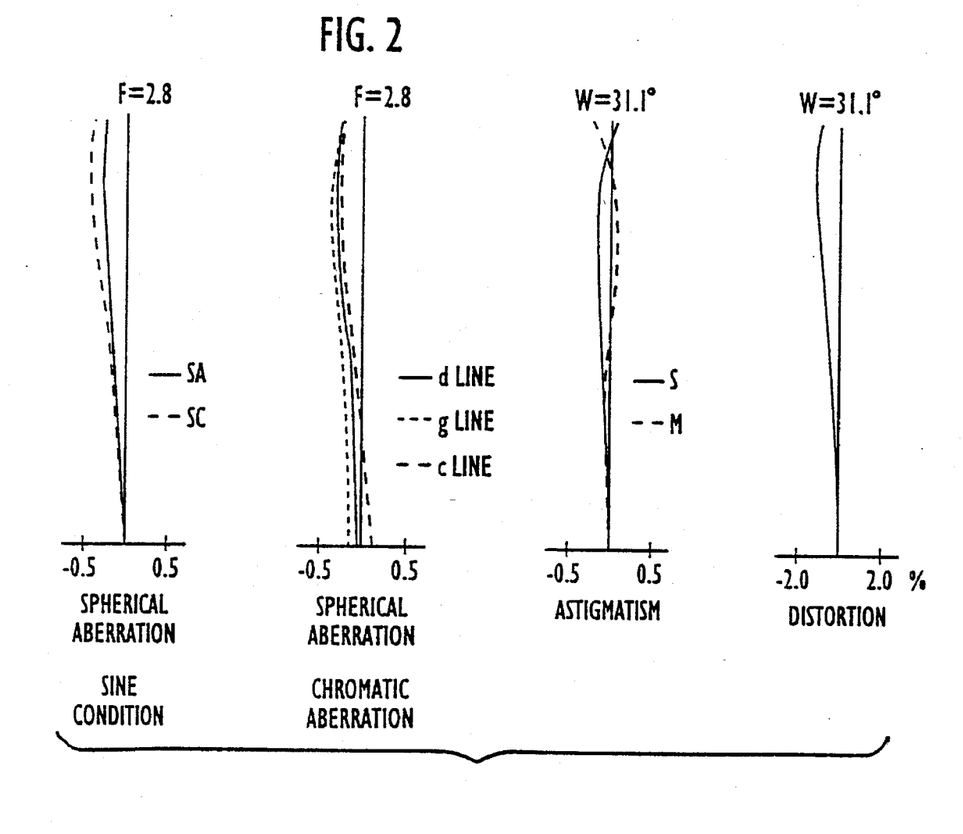
FIG. 2 shows various aberration diagrams of the zoom lens system shown in FIG. 1 at a wide angle extremity thereof.
Figure 3:
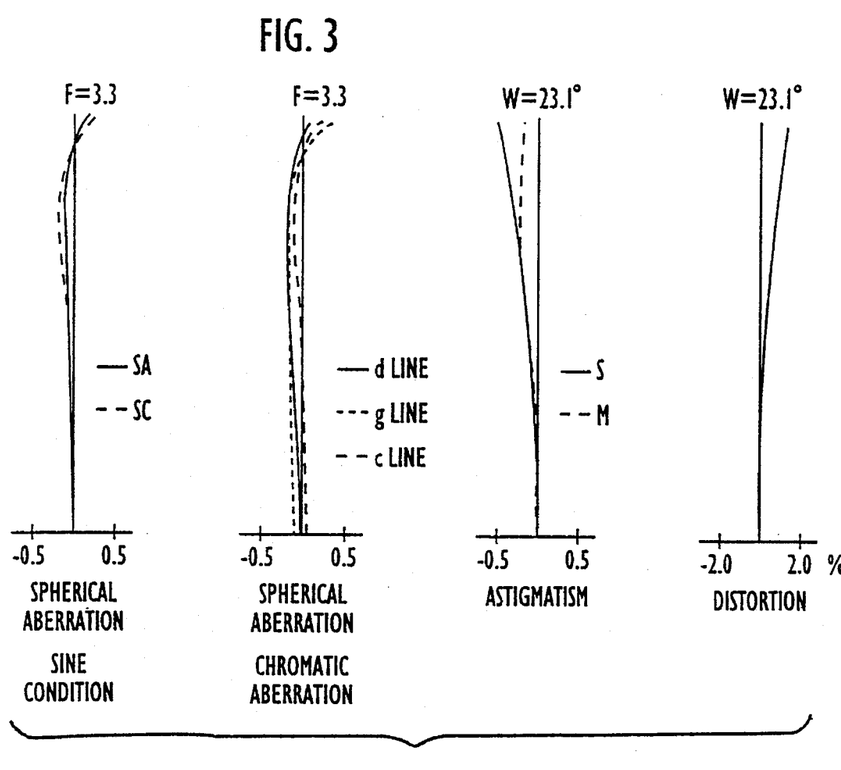
FIG. 3 shows various aberration diagrams of the zoom lens system shown in FIG. 1 at an intermediate focal length.
Figure 4:
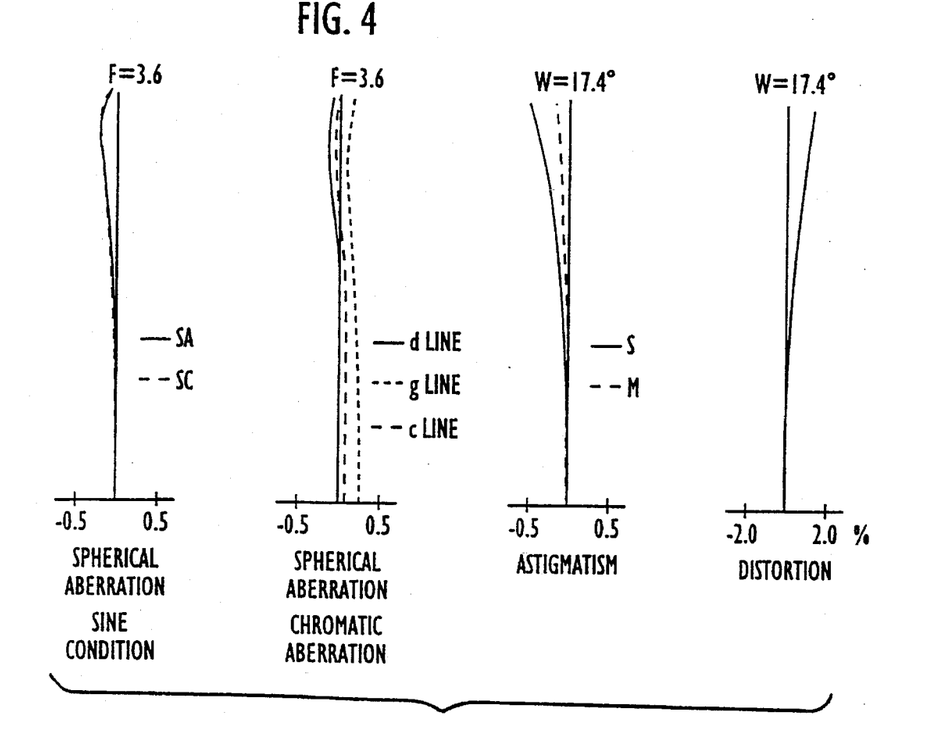
FIG. 4 shows various aberration diagrams of the zoom lens system shown in FIG. 1 at a telephoto extremity.

In FIGS. 2 through 4, "SA" designates a spherical aberration, "SC" designates a sine condition, "d-line", "g-line" and "c-line" designate a chromatic aberration represented by the spherical aberration, at respective wavelengths, "S" designates a sagittal ray, and "M" designates a meridional ray.

In the tables and the drawings, "$F_{NO}$" designates a F-number, "f" designates a focal length, "$\omega$" designates a half angle of view, "$f_B$" designates a back-focal distance, "R" designates a radius of curvature of each lens surface, "D" designates a lens thicknesses or distance between the lenses, "Nd" designates a refractive index of the d-line, and "$\nu d$" designates an Abbe number of the d-line.

TABLE 1

$F_{NO}$ = 1:2.8–3.3–3.6
f = 36.05–50.00–68.00
$\omega$ = 31.1–23.1–17.4
$f_B$ = 8.50–19.79–33.78

| surface No. | R | D | Nd | νd |
|---|---|---|---|---|
| 1 | −37.027 | 1.50 | 1.84666 | 23.8 |
| 2 | −97.101 | 0.10 | — | — |
| 3 | 43.933 | 4.40 | 1.77250 | 49.6 |
| 4 | −53.358 | 3.37–5.23–7.13 | — | — |
| 5 | −23.481 | 1.20 | 1.83481 | 42.7 |
| 6 | 33.049 | 4.53 | 1.80518 | 25.4 |
| 7 | −144.624 | 3.45 | — | — |
| 8 | 29.362 | 7.00 | 1.48749 | 70.2 |
| 9 | −14.587 | 1.50 | 1.80518 | 25.4 |
| 10 | −22.137 | 0.19 | — | — |
| 11 | 94.096 | 3.00 | 1.66910 | 55.4 |
| 12* | −62.289 | 1.00 | — | — |
| STOP | ∞ | 9.69–5.09–1.71 | — | — |
| 13 | −49.102 | 3.00 | 1.80518 | 25.4 |
| 14 | −24.857 | 1.88 | — | — |
| 15 | −33.569 | 1.30 | 1.83400 | 37.2 |
| 16 | −171.053 | 3.08 | — | — |
| 17 | −18.539 | 1.40 | 1.77250 | 49.6 |
| 18 | −542.096 | — | — | — |

*marked surface is aspherical.
NO. 12: K = 0.0, A4 = 0.15943 × $10^{-4}$, A6 = 0.15268 × $10^{-7}$, A8 = 0.42536 × $10^{-10}$, A10 = 0.0, A12 = 0.0

The shape of the aspheric surface can be generally expressed as follows:

$$X=CY^2/\{+[1-(1K)C^2Y^2]^{1/2}\}+A_4Y^4+A_6Y^6+A_8Y^8+A_{10}Y^{10}+\ldots,$$

wherein, Y represents a height above the axis,

X represents a distance from a tangent plane of an aspherical vertex,

C represents a curvature of an aspherical vertex(l/r),

K represents a conic constant, $A_4$ represents a fourth-order aspherical factor, $A_6$ represents a sixth-order aspherical factor, $A_8$ represents a eighth-order aspherical factor, $A_{10}$ represents a tenth-order aspherical factor.

Figure 5:
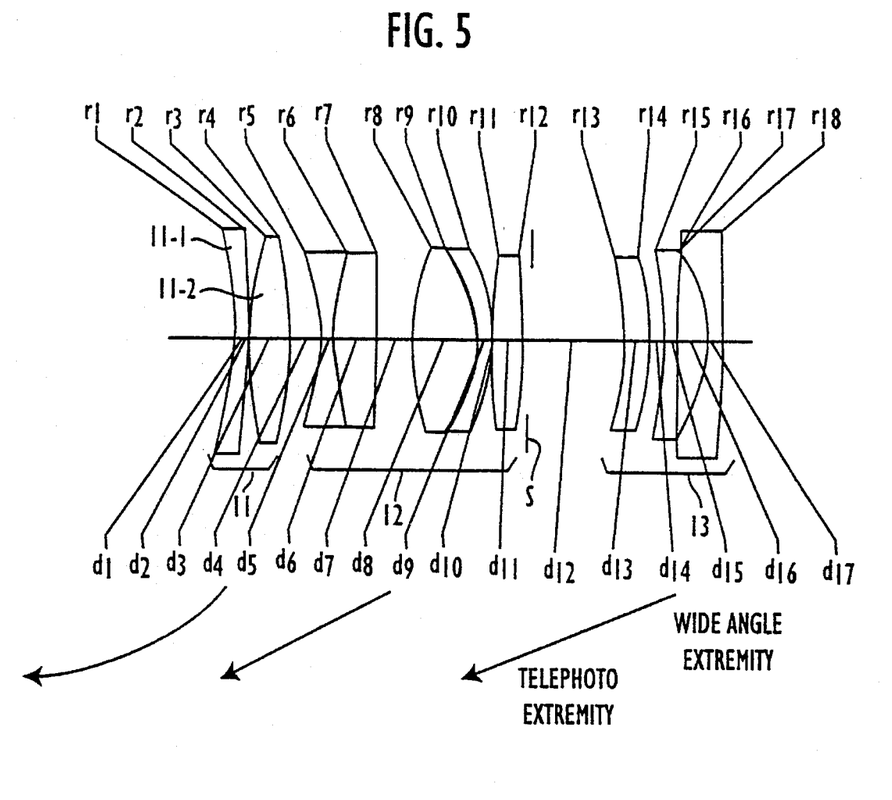
FIG. 5 is a schematic view of a lens arrangement of a zoom lens system, according to a second embodiment of the present invention.

FIG. 5 shows a lens arrangement of a zoom lens system according to a second embodiment of the present invention. The lens arrangement in the second embodiment is substantially identical to that of the first embodiment.

Figure 6:
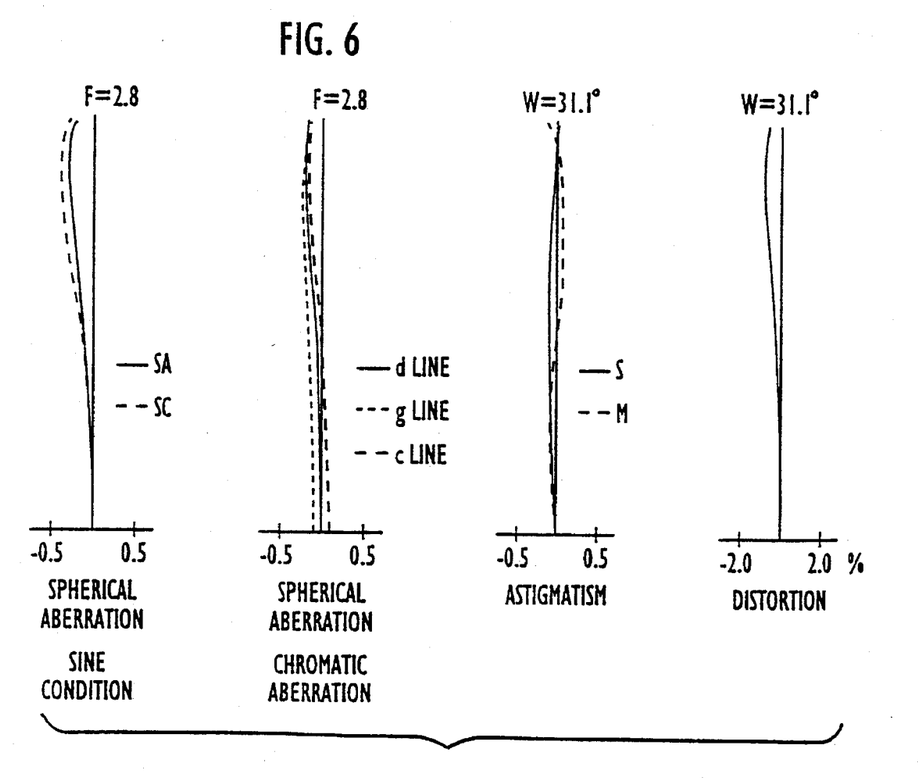
FIG. 6 shows various aberration diagrams of the zoom lens system shown in FIG. 5 at a wide angle extremity thereof.
Figure 7:
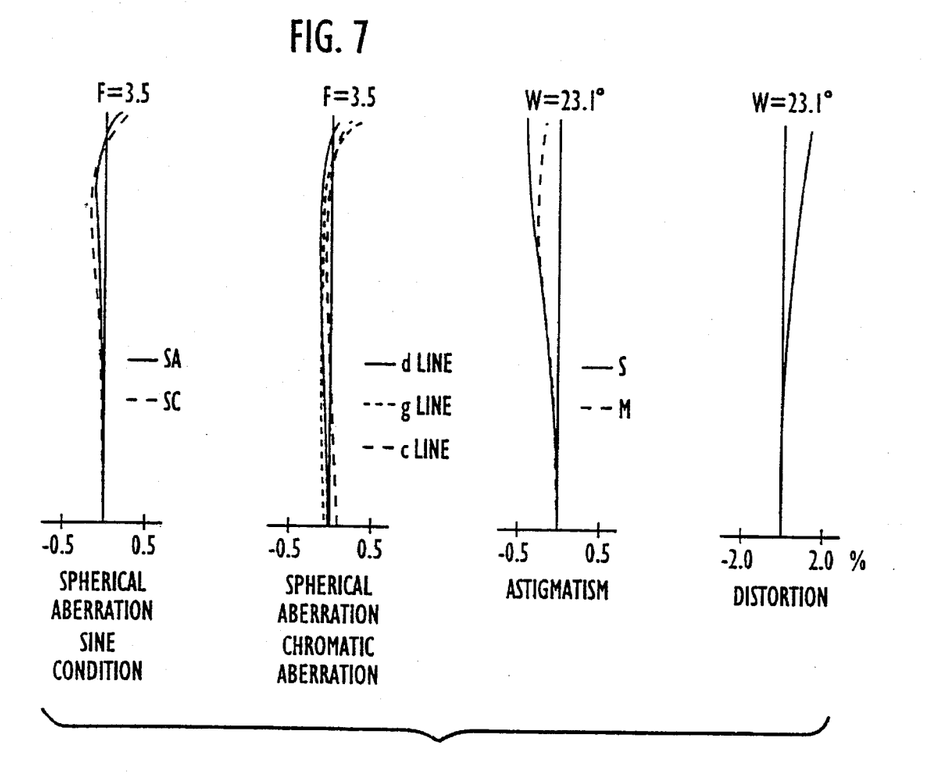
FIG. 7 shows various aberration diagrams of the zoom lens system shown in FIG. 5 at an intermediate focal length position.
Figure 8:
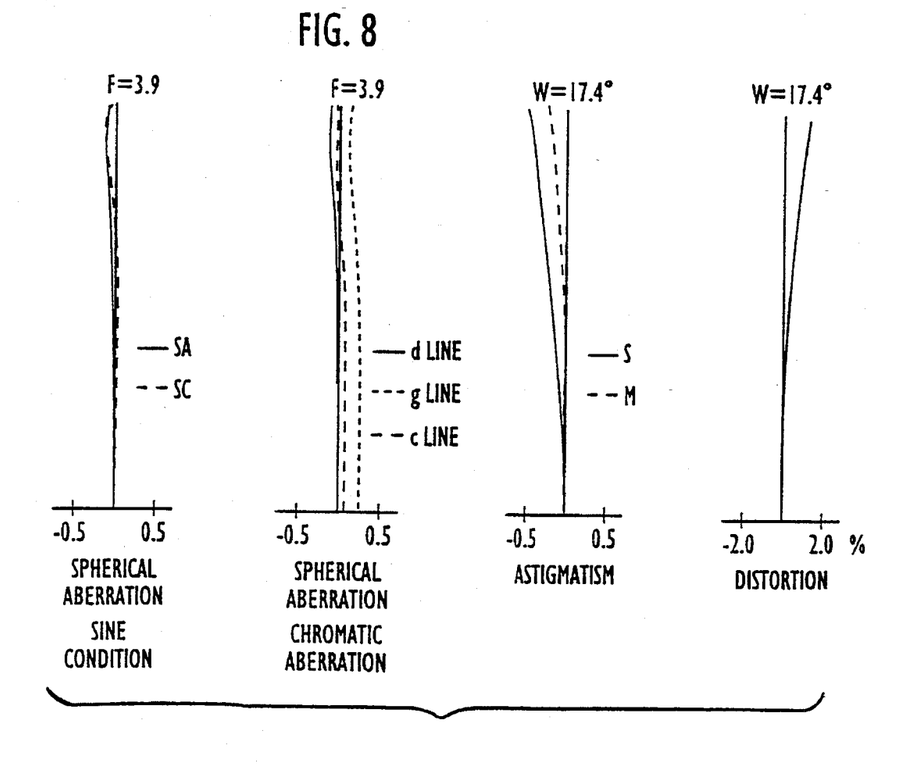
FIG. 8 shows various aberration diagrams of the zoom lens system shown in FIG. 5 at a telephoto extremity.

Numerical data of the lens system shown in FIG. 5 is shown in Table 2 below. Diagrams of various aberrations thereof at the wide-angle extremity, an intermediate focal length and the telephoto extremity are shown in FIGS. 6, 7 and 8, respectively.

TABLE 2

$F_{NO}$ = 1:2.8–3.5–3.9
f = 36.04–50.00–68.00
$\omega$ = 31.1–23.1–17.4
$f_B$ = 8.49–19.73–33.63

| surface No. | R | D | Nd | νd |
|---|---|---|---|---|
| 1 | −36.824 | 1.50 | 1.84666 | 23.8 |
| 2 | −97.340 | 0.10 | — | — |
| 3 | 47.242 | 4.39 | 1.77250 | 49.6 |
| 4 | −51.270 | 3.49–5.34–7.25 | — | — |
| 5 | −23.130 | 1.20 | 1.83481 | 42.7 |
| 6 | 32.779 | 4.37 | 1.80518 | 25.4 |
| 7 | −114.808 | 4.01 | — | — |
| 8 | 28.725 | 6.70 | 1.48749 | 70.2 |

TABLE 2-continued $F_{NO} = 1:2.8-3.5-3.9$
$f = 36.04-50.00-68.00$
$\omega = 31.1-23.1-17.4$
$f_B = 8.49-19.73-33.63$

| surface No. | R | D | Nd | νd |
|---|---|---|---|---|
| 9 | −14.660 | 1.50 | 1.80518 | 25.4 |
| 10 | −22.266 | 0.11 | — | — |
| 11 | 86.688 | 3.00 | 1.58913 | 61.2 |
| 12* | −56.827 | 1.00 | — | — |
| STOP | ∞ | 9.51−5.01−1.72 | — | — |
| 13 | −49.559 | 3.42 | 1.80518 | 25.4 |
| 14 | −24.843 | 1.84 | — | — |
| 15 | −35.835 | 1.30 | 1.83400 | 37.2 |
| 16 | −217.047 | 3.24 | — | — |
| 17 | −17.882 | 1.40 | 1.77250 | 49.6 |
| 18 | −481.791 | — | — | — |

Figure 9:
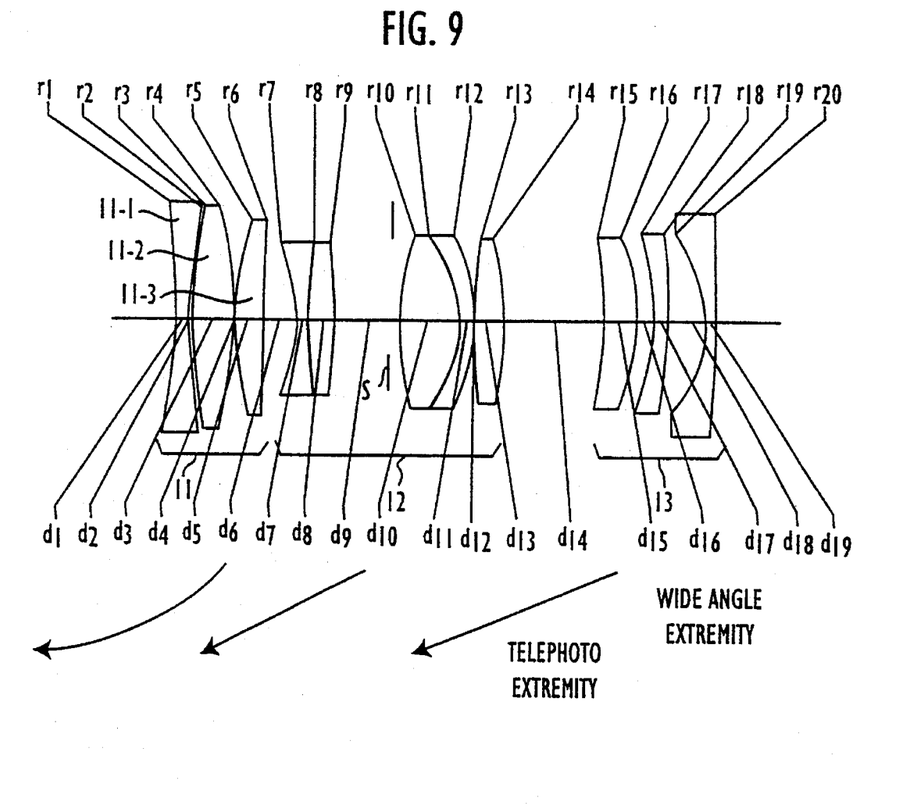
FIG. 9 is a schematic view of a lens arrangement of a zoom lens system, according to a third embodiment of the present invention.

*marked surface is aspherical.
NO. 12: $K = 0.0$, $A4 = 0.19140 \times 10^{-4}$, $A6 = 0.12126 \times 10^{-7}$, $A8 = 0.71842 \times 10^{-10}$, $A10 = 0.0$, $A12 = 0.0$ FIG. 9 shows a lens arrangement of a zoom lens system according to a third embodiment of the present invention. In the third embodiment, the first lens group 11 comprises of a negative lens 11-1 having a concave surface located on the object side, and positive lenses 11-2 and 11-3. The other basic structure of the third embodiment is substantially the same as the first embodiment except the position of the diaphragm S. Note that there is no aspherical surface.

Figure 10:
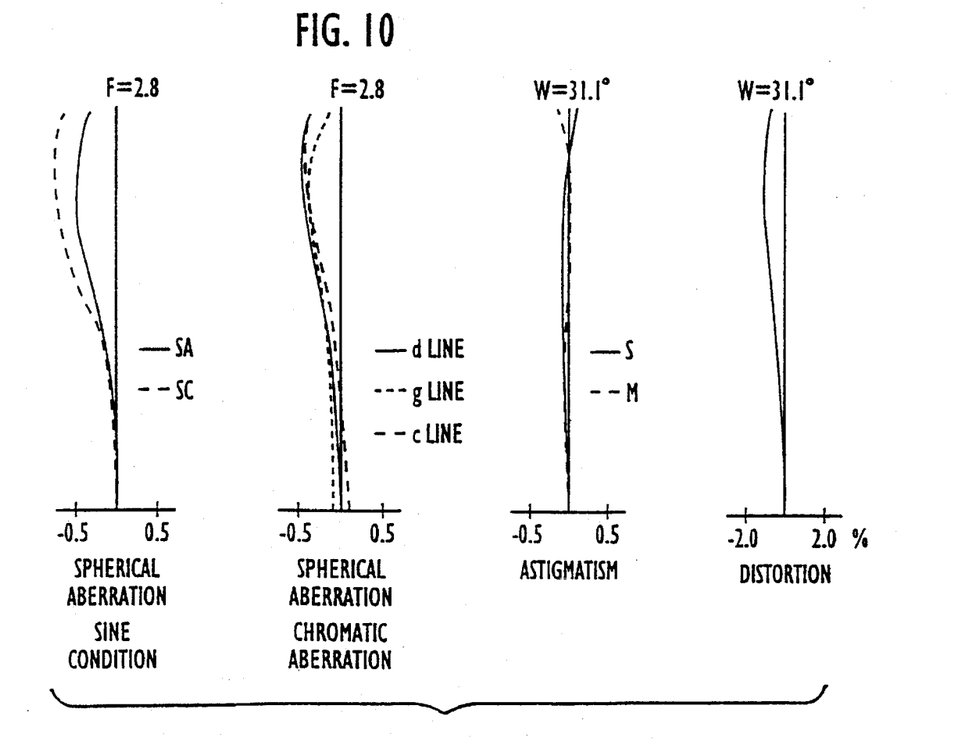
FIG. 10 shows various aberration diagrams of the zoom lens system shown in FIG. 9 at a wide angle extremity thereof.
Figure 11:
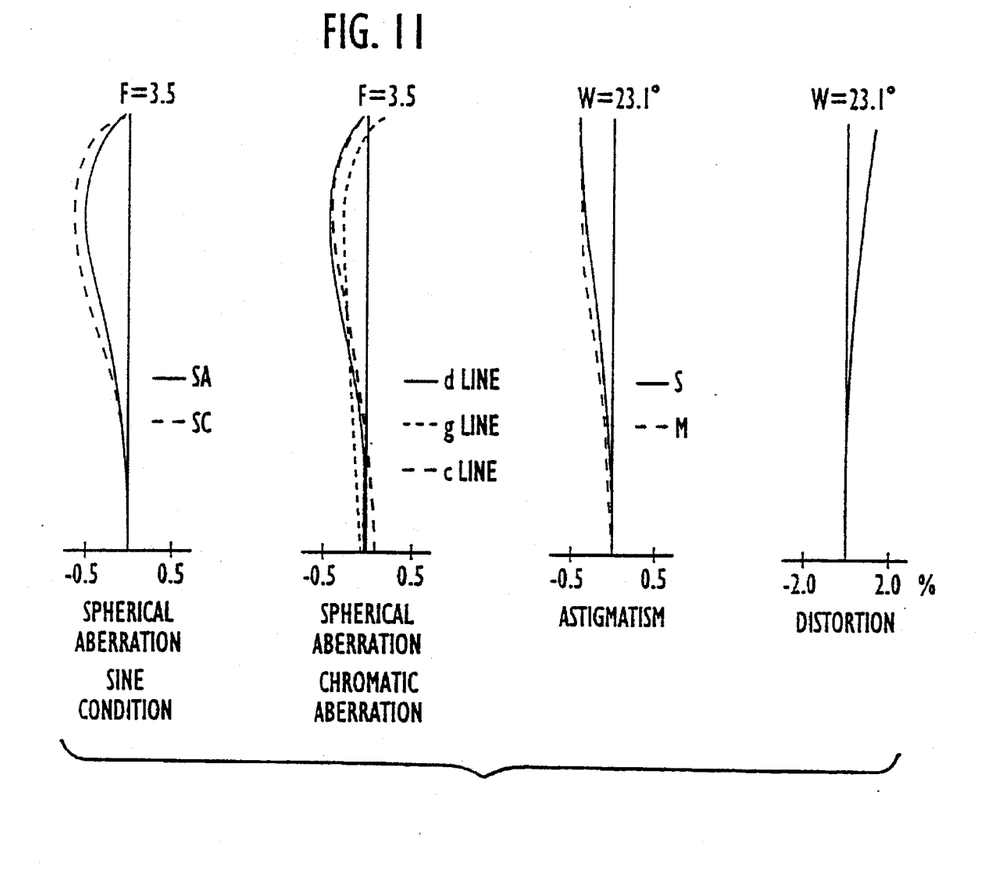
FIG. 11 shows various aberration diagrams of the zoom lens system shown in FIG. 9 at an intermediate focal length; and, FIG. 12 shows various aberration diagrams of the zoom lens system shown in FIG. 9 at a telephoto extremity.
Figure 12:
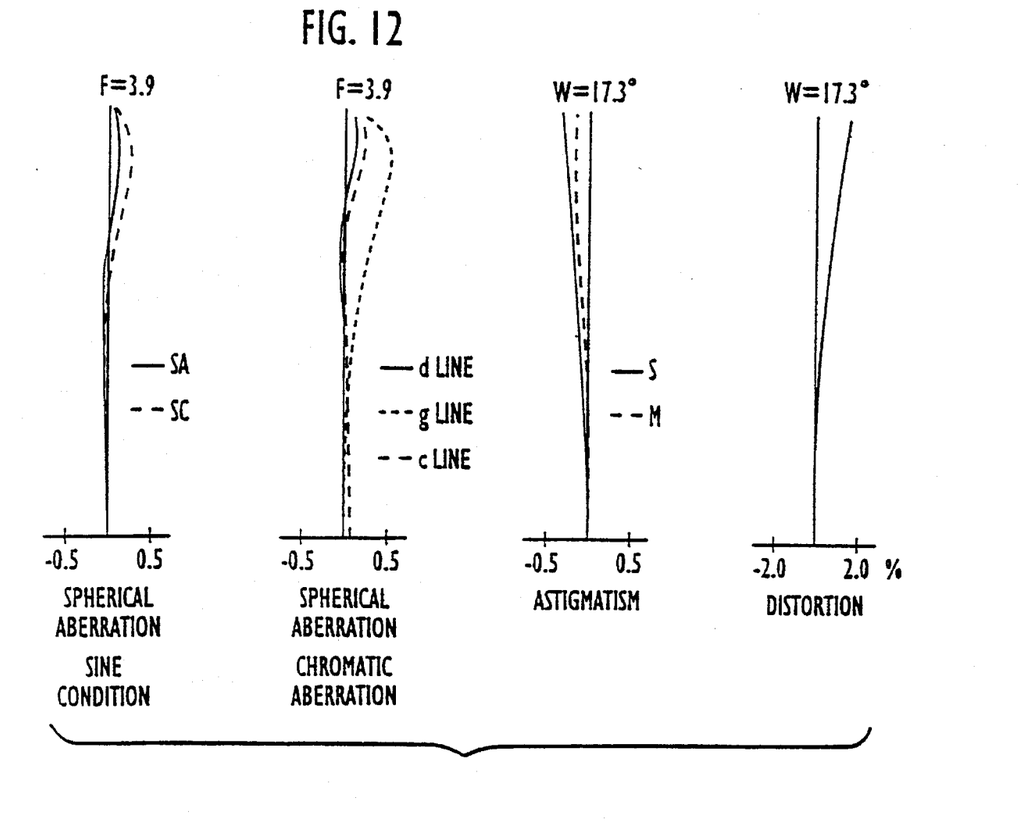

Numerical data of the lens system shown in FIG. 9 is shown in Table 3 below. Diagrams of various aberrations thereof at a wide-angle extremity, an intermediate focal length and a telephoto extremity are shown in FIGS. 10, 11 and 12, respectively.

TABLE 3

$F_{NO} = 1:2.8-3.5-3.9$
$f = 36.05-50.00-68.00$
$\omega = 31.1-23.1-17.3$
$f_B = 8.45-19.25-32.24$

| surface No. | R | D | Nd | νd |
|---|---|---|---|---|
| 1 | −60.000 | 1.50 | 1.83400 | 37.2 |
| 2 | 109.368 | 0.42 | — | — |
| 3 | 82.723 | 4.80 | 1.58913 | 61.2 |
| 4 | −43.060 | 0.10 | — | — |
| 5 | 45.527 | 2.78 | 1.58913 | 61.2 |
| 6 | 648.480 | 3.50−6.65−10.17 | — | — |
| 7 | −23.356 | 1.20 | 1.83481 | 42.7 |
| 8 | 45.230 | 3.00 | 1.80518 | 25.4 |
| 9 | −54.641 | 6.05 | — | — |
| STOP | ∞ | 1.00 | — | — |
| 10 | 52.301 | 6.70 | 1.51633 | 64.1 |
| 11 | −13.035 | 1.50 | 1.80518 | 25.4 |
| 12 | −23.973 | 0.10 | — | — |
| 13 | 91.465 | 3.00 | 1.58913 | 61.2 |
| 14 | −40.623 | 11.60−7.06−3.74 | — | — |
| 15 | −87.414 | 3.80 | 1.80518 | 25.4 |
| 16 | −24.533 | 1.86 | — | — |
| 17 | −23.700 | 1.30 | 1.83400 | 37.2 |
| 18 | −100.630 | 4.31 | — | — |
| 19 | −17.903 | 1.40 | 1.77250 | 49.6 |
| 20 | −711.363 | — | — | — |

Values of the formulae (1) through (8) in the first, second, and third embodiments are shown in Table 4 below.

TABLE 4

| | Embodiment 1 | Embodiment 2 | Embodiment 3 |
|---|---|---|---|
| formula (1) | 1.26 | 1.21 | 0.89 |
| formula (2) | 2.52 | 2.53 | 2.43 |
| formula (3) | −0.97 | −0.98 | −0.60 |
| formula (4) | −1.53 | −1.56 | −1.54 |
| formula (5) | 2.47 | 2.46 | 2.77 |
| formula (6) | −1.45 | −1.45 | −1.47 |
| formula (7) | 0.833 | 0.840 | 0.950 |
| formula (8) | 0.076 | 0.076 | 0.078 |

As can be seen from Table 4 above, all three embodiments satisfy the requirements defined by the formulae (1) through (8). Moreover, according to the present invention, the various aberrations at the wide-angle extremity, an intermediate focal length and the telephoto extremity can be correctly compensated.

As may be understood from the above discussion, according to the present invention, a small zoom lens of a large aperture in which the zooming ratio is approximately 2, and the F-numbers at the wide angle extremity and the telephoto extremity are approximately 2.8 and approximately 3.5 to 4, respectively, can be obtained.

I claim:

1. A zoom lens system including at least three lens groups, comprising:

a positive first lens group;

a positive second lens group; and a negative third lens group, arranged in this order from an object side, wherein said first, second and third lens groups are all moved toward said object side during zooming from a wide angle extremity to a telephoto extremity, such that a distance between said first lens group and said second lens group increases and a distance between said second lens group and said third lens group decreases, and wherein said zoom lens system satisfies the following relationships:

$0.7 < f_L/f_1 < 1.4$;

$2.0 < m_{3L} < 2.8$, wherein, "$f_L$" designates a focal length of a whole lens system at said telephoto extremity; "$f_1$" designates a focal length of said first lens group; and "$m_{3L}$" designates a lateral magnification of said third lens group at said telephoto extremity.

2. A zoom lens system according to claim 1, wherein said positive first lens group comprises a first lens adjacent to an object to be photographed comprising a negative lens having a concave surface located on said object side and which satisfies the following formula:

$-1.3 < f_s/r_{1-1} < 0$, wherein "$r_{1-1}$" designates a radius of curvature of a first surface (adjacent to said object) of said first lens group; and "$f_s$" designates a focal length of a whole lens system at said wide angle extremity.

3. A zoom lens system according to claim 1, wherein said second positive lens group comprises a negative subgroup and a positive subgroup, in this order from said object side, wherein a lens surface of said negative subgroup located closest to an object to be photographed is a concave surface, and wherein said positive subgroup includes a cemented lens that satisfies the following formulae:

$$-2.0 < f_S/r_{2\text{-}1} < -1.0;$$

and $$2.0 < f_S/|r_{2C}| < 3.0,$$

wherein, "$r_{2\text{-}1}$" designates a radius of curvature of a lens surface of said second lens group located closest to said object to be photographed; and "$r_{2C}$" designates a radius of curvature of a cemented surface of said cemented lens.

4. A zoom lens system according to claim 1, wherein said negative third lens group includes a first lens located closest to an object to be photographed comprising a positive lens having a convex surface located on an image side that satisfies the following formula:

$$-2.0 < f_S/r_{3\text{-}2} < -1.0,$$

wherein, "$r_{3\text{-}2}$" designates a radius of curvature of a second lens surface (on said object image side) of said positive lens of said third lens group.

5. A zoom lens system according to claim 1, wherein said first lens group and said third lens group satisfy the following formulae:

$$0.7 < (X_1/X_3)_L < 1.1;$$

and $$0.03 < (X_1/X_3)_L - (X_1/X_3)_M < 0.2,$$

wherein, "$(X_1/X_3)_L$" designates a ratio of displacement of said first lens group and said third lens group from said wide angle extremity to said telephoto extremity; and "$(X_1/X_3)_M$" designates a ratio of displacement of said first lens group and said third lens group from said wide angle extremity to a vicinity of an intermediate focal length $f_M$, where $f_M \approx (f_S \cdot f_L)^{1/2}$.

* * * * *